United States Patent
Matumura et al.

(10) Patent No.: US 7,615,194 B2
(45) Date of Patent: Nov. 10, 2009

(54) PURIFICATION COMPOSITION AND FILTER FOR OZONE-CONTAINING EXHAUST GAS

(75) Inventors: Yuji Matumura, Yokohama (JP); Masahiko Yoneda, Yokohama (JP); Kazuki Yamana, Yokohama (JP); Satoshi Minobe, Yokohama (JP)

(73) Assignee: Nichias Corporation, Tokyo (JP)

( * ) Notice: Subject to any disclaimer, the term of this patent is extended or adjusted under 35 U.S.C. 154(b) by 633 days.

(21) Appl. No.: 11/334,491

(22) Filed: Jan. 19, 2006

(65) Prior Publication Data
US 2006/0182669 A1      Aug. 17, 2006

(30) Foreign Application Priority Data
Jan. 26, 2005  (JP) ............................. 2005-017704

(51) Int. Cl.
*C01B 13/02* (2006.01)
*C01B 31/08* (2006.01)

(52) U.S. Cl. .................... 422/177; 423/219; 502/324; 502/416; 502/417; 502/527.19

(58) Field of Classification Search ............... 502/417, 502/324, 416; 95/285, 90; 422/177; 423/219
See application file for complete search history.

(56) References Cited

U.S. PATENT DOCUMENTS 5,277,931 A * 1/1994 Maglio et al. ............... 427/212
2001/0052224 A1 * 12/2001 Gelderland et al. ........... 55/521
2003/0200868 A1 * 10/2003 Koslow ....................... 95/285
2008/0300131 A1 * 12/2008 Bandosz ..................... 502/400

FOREIGN PATENT DOCUMENTS

| JP | 3-213145 | 9/1991 |
|---|---|---|
| JP | 5-23590 | 2/1993 |

* cited by examiner

*Primary Examiner*—Wayne Langel
*Assistant Examiner*—Syed Iqbal
(74) *Attorney, Agent, or Firm*—Oblon, Spivak, McClelland, Maier & Neustadt, L.L.P.

(57) ABSTRACT

A composition for purifying an ozone-containing gas comprising activated carbon, in which the percentage of the volume of pores having a pore diameter of 0.4-0.8 nm in the volume of pores having a pore diameter of 0.4-2.0 nm is 75% or more, and an ozone decomposition catalyst powder is disclosed. Also disclosed is a filter for purifying an ozone-containing exhaust gas comprising activated carbon powder, in which the percentage of the volume of pores having a pore diameter of 0.4-0.8 nm in the volume of pores having a pore diameter of 0.4-2.0 nm is 75% or more, and an ozone decomposition catalyst powder carried on a fiber supporting body. The composition and filter of the present invention can remarkably reduce the content of ozone and volatile organic compounds in ozone-containing exhaust gas from printers.

14 Claims, 1 Drawing Sheet

PURIFICATION COMPOSITION AND FILTER FOR OZONE-CONTAINING EXHAUST GAS

BACKGROUND OF THE INVENTION

1. Field of the Invention

The present invention relates to a purification composition and filter for removing ozone and volatile organic compounds in an ozone-containing exhaust gas from a copying machine or a printing machine.

2. Background Art

When characters are printed using a printing machine such as a laser printer, a copying machine, or a facsimile machine, oxygen in the air is oxidized by laser radiation to produce ozone which is a toxic substance. For this reason, an ozone decomposition filter with an ozone decomposition catalyst such as manganese oxide carried thereon has conventionally been used in printing machines.

For example, Japanese Patent Application Laid-open No. 1991-213145 discloses a corrugated honeycomb structure carrying thereon one or more oxides (ozone decomposition catalysts) of metal selected from the group consisting of vanadium, molybdenum, zirconia, tin, niobium, tungsten, titanium, manganese, and silver and activated carbon in an amount of 5-50 wt % of the metal oxide.

Japanese Patent Application Laid-open No. 1993-23590 discloses a honeycomb structure for catalytically decomposing ozone in a gas with a relative humidity of 60% or more. The honeycomb structure carries a mixture of an active material having ozone decomposition capability (ozone decomposition catalyst) and activated carbon at a ratio of 50:50 to 5:95.

In addition to ozone, volatile organic compounds contained in ink, toner, or the like evaporate and are discharged from the printer to the room. Emission of such volatile organic compounds are also regulated because of the recently increased concern over environmental problems. For example, Japan already has a regulation of an indoor concentration of styrene. Emission of other volatile organic compounds such as benzene may also be regulated in the future. In Germany, in addition to ozone and styrene, emission of volatile organic compounds such as benzene is controlled by authorizing manufacturers to attach a Blue Angel mark only to products satisfying a specified emission standard.

Since activated carbon can adsorb volatile organic compounds in general, the activated carbon can be used for adsorbing and removing volatile organic compounds from the gas containing the volatile organic compounds. Therefore, conventional ozone decomposition filters containing activated carbon such as the honeycomb structures disclosed in Japanese Patent Applications Laid-open No. 1991-213145 and No. 1993-23590 are expected to have the capability of removing volatile organic compounds in ozone-containing exhaust gas from printers.

However, it is difficult for such conventional ozone decomposition filters containing activated carbon to remove volatile organic compounds in ozone-containing exhaust gas from printers which contains a small amount of volatile organic compounds. The amount of volatile organic compounds in ozone-containing exhaust gas from printers is usually 0.01-100 $mg/m^3$ and the amount of ozone is usually 0.001-1,000 $mg/m^3$.

The emission control regulations for ozone and volatile organic compounds are becoming more stringent year by year, and more stringent regulations than ever are anticipated to be imposed in the future.

Accordingly, an object of the present invention is to provide a composition and filter for purifying an ozone-containing gas discharged from printers which can remarkably reduce the content of ozone and volatile organic compounds in ozone-containing exhaust gas from printers.

SUMMARY OF THE INVENTION

As a result of extensive studies to achieve the above object, the inventors of the present invention have discovered that (1) the pore diameter of activated carbon greatly affects adsorption performance for removing volatile organic compounds in ozone-containing exhaust gas which contains a small amount of volatile organic compounds and (2) volatile organic compounds can be efficiently removed from ozone-containing exhaust gas which contains a small amount of volatile organic compounds by using activated carbon having pores with a specified pore size in a proportion above a specified percentage.

Specifically, the present invention provides a composition for purifying an ozone-containing exhaust gas comprising an activated carbon powder, in which the percentage of the volume of pores having a pore diameter of 0.4-0.8 nm in the volume of pores having a pore diameter of 0.4-2.0 nm is 75% or more, and an ozone decomposition catalyst powder.

The present invention further provides a filter for purifying an ozone-containing exhaust gas comprising a fiber supporting body or a metal supporting body carrying thereon an activated carbon powder, in which the percentage of the volume of pores having a pore diameter of 0.4-0.8 nm in the volume of pores having a pore diameter of 0.4-2.0 nm is 75% or more, and an ozone decomposition catalyst powder.

The composition and filter for purifying ozone-containing exhaust gas of the present invention can effectively remove ozone and volatile organic compounds from ozone-containing exhaust gas discharged from printers and can remarkably reduce the content of ozone and volatile organic compounds.

DETAILED DESCRIPTION OF THE INVENTION AND PREFERRED EMBODIMENTS

Figure 1:
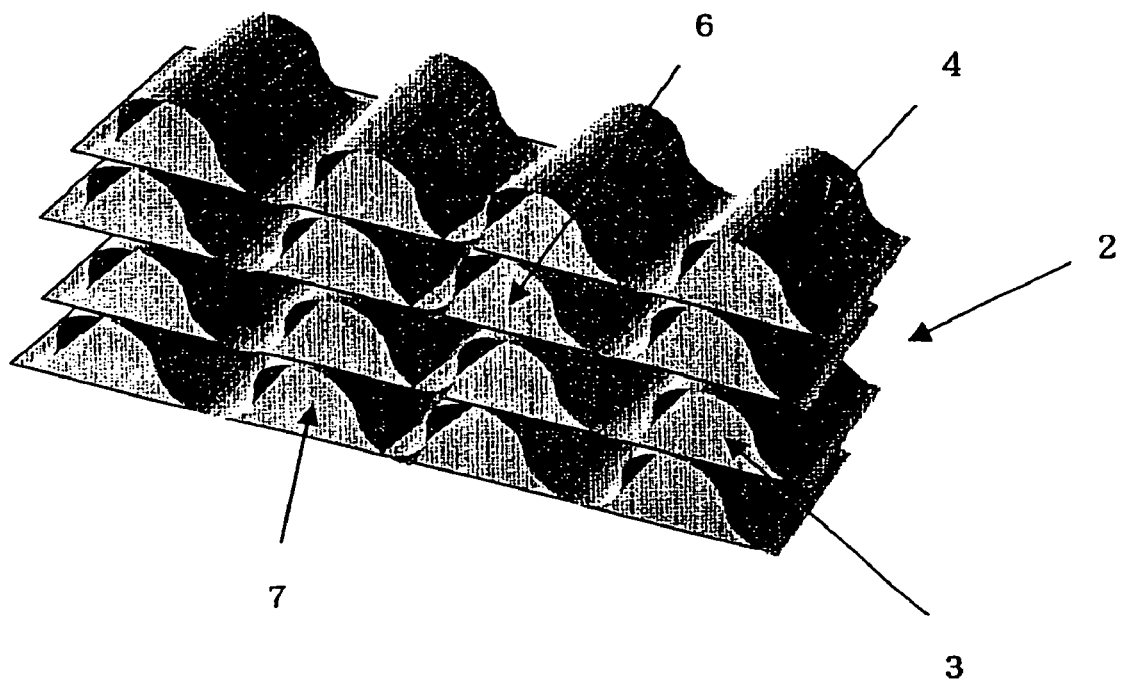
FIG. 1 is a schematic perspective view of a fiber supporting body having a corrugated-honeycomb structure and FIG. 2 is a schematic cross-sectional view of the fiber supporting body having a corrugated-honeycomb structure.

The composition for purifying ozone-containing exhaust gas (hereinafter referred to from time to time as "composition of the present invention") comprises an activated carbon powder and an ozone decomposition catalyst powder.

In the activated carbon powder used in the composition of the present invention, the percentage of the volume of pores having a pore diameter of 0.4-0.8 nm in the volume of pores having a pore diameter of 0.4-2.0 nm is 75% or more. This requirement applies also to the activated carbon powder used in the later-described filter of the present invention for purifying ozone-containing exhaust gas. The percentage of the volume of pores having a pore diameter of 0.4-0.8 nm in the volume of pores having a pore diameter of 0.4-2.0 nm in the activated carbon powder used in the composition of the present invention is preferably 77-95%, particularly preferably 79-90%, and more preferably 80-85%.

Conventionally, the capability of activated carbon powder for adsorbing volatile organic compounds has been considered to be strongly related to the pore volume or specific surface area. Specifically, it has been believed that the greater the pore volume or the specific surface area of the activated carbon powder, the greater the capability of adsorbing volatile organic compounds. However, extensive studies undertaken by the present inventors have confirmed that (i) the effect of the pore volume or specific surface area of activated carbon on the capability of adsorbing volatile organic compounds is great when the volatile organic compounds are removed from an ozone-containing exhaust gas which contains a comparatively large amount of volatile organic compounds and (ii) such an effect of the pore volume or specific surface area of activated carbon is comparatively small when volatile organic compounds are removed from an ozone-containing exhaust gas from printers which contains a comparatively small amount of volatile organic compounds, specifically, the adsorption capability is not necessarily increased by an increase in the pore volume or specific surface area. The inventors further found that (iii) when voc (volatile organic compounds) are adsorbed and removed from ozone-containing exhaust gas with a small content of voc, the adsorption capability of activated carbon powder is greatly affected by the pore diameter and that (iv) pores with a diameter in the range of 0.4-0.8 nm among the pores in activated carbon powder is suitable for adsorbing and removing voc from ozone-containing exhaust gas which contains only a small amount of voc (the same applies to the activated carbon powder used in the later-described filter of the present invention for purifying ozone-containing exhaust gas.).

Now, the method for calculating the percentage of the volume of pores having a pore diameter of 0.4-0.8 nm in the volume of pores having a pore diameter of 0.4-2.0 nm in an activated carbon powder will now be described. First, a nitrogen adsorption-desorption isotherm of an activated carbon powder is determined by placing the activated carbon powder in a test tube, gradually increasing the relative pressure of nitrogen gas in the test tube to measure the amount of adsorbed nitrogen gas, and gradually decreasing the relative pressure to measure the residual amount of adsorbed nitrogen gas. Next, the resulting nitrogen adsorption-desorption isotherm of an activated carbon powder is analyzed by the MP method to determined the volume A (ml/g) of pores having a pore diameter of 0.4-0.8 nm and the volume B (ml/g) of pores having a pore diameter of 0.4-2.0 nm in an activated carbon powder. Then, the percentage C (%) of the volume of pores having a pore diameter of 0.4-0.8 nm in the volume of pores having a pore diameter of 0.4-2.0 nm is calculated using the following equation (1).

$$C(\%) = (A/B) \times 100 \quad (1)$$

In the present invention, the nitrogen adsorption-desorption isotherm of activated carbon powder was determined by using "Bellsoap 18 Plus" manufactured by Bell Japan, Inc. The detailed analytical method for determining the nitrogen adsorption-desorption isotherm of activated carbon powder will be discussed later.

The volume A of pores having a diameter of 0.4-0.8 nm in the activated carbon powder used in the composition of the present invention is preferably 0.1-1.0 ml/g, and particularly preferably 0.2-0.6 ml/g.

Although there are no specific limitations, the total volume of pores in the activated carbon powder is preferably 0.1-2 ml/g, more preferably 0.2-1 ml/g, and still more preferably 0.3-1 ml/g. If the total pore volume of the activated carbon powder is less than 0.1 ml/g, the capability of adsorbing voc from the ozone-containing exhaust gas tends to decrease; if more than 2 ml/g, the proportion of pores with a diameter of 0.8 nm or less tends to decrease, giving rise to a decrease in the adsorption capability of the activated carbon powder and an increase in production cost of the activated carbon powder (the same applies to the activated carbon powder used in the later-described filter of the present invention for purifying ozone-containing exhaust gas.).

Although there are no specific limitations, the average particle diameter of the activated carbon powder is preferably 1-50 μm, and particularly preferably 10-20 μm. The average particle diameter of the activated carbon powder in the above ranges reduces interference due to binders and ensures a large effective surface area.

There are no specific limitations to the ozone decomposition catalyst powder used, insofar as the catalyst powder comprises a metal oxide having ozone decomposition capability. As the metal oxide having ozone decomposition capability, manganese oxide powder, a composite oxide powder of copper oxide and manganese oxide, a composite oxide powder of iron oxide and manganese oxide, a composite oxide powder of cobalt oxide and manganese oxide, and a mixture of two or more of these oxide powders are preferable due to the high ozone decomposition performance (the same applies to the ozone decomposition catalyst powder used in the later-described filter for purifying ozone-containing exhaust gas.).

Although there are no specific limitations, the average particle diameter of the ozone decomposition catalyst powder is preferably 1-100 μm, and particularly preferably 1-50 μm.

The content of the activated carbon powder used in the composition of the present invention is 50-99 wt %, preferably 60-90 wt %, and more preferably 70-80 wt %. If the content of the activated carbon powder used in the composition of the present invention is less than 50 wt %, adsorbing and removing performance of the voc from the ozone-containing exhaust gas tends to decrease; if more than 99 wt %, ozone decomposition performance tends to decrease.

The content of the ozone decomposition catalyst powder used in the composition of the present invention is 1-50 wt %, preferably 10-40 wt %, and more preferably 20-30 wt %. If the content of the ozone decomposition catalyst powder used the composition of the present invention is less than 1 wt %, the performance of decomposing ozone in the ozone-containing exhaust gas tends to decrease; if more than 50 wt %, adsorbing and removing performance of the voc tends to decrease.

Although there are no specific limitations, the ratio of the content of the activated carbon powder to the content of the ozone decomposition catalyst powder (activated carbon powder/ozone decomposition catalyst powder) used in the composition of the present invention is preferably 1-99, more preferably 1.5-9, and particularly preferably 2-4. The ratio of the content of the activated carbon powder to the content of the ozone decomposition catalyst powder in the above range ensures excellent ozone decomposition performance of the ozone decomposition catalyst powder without impairing the voc adsorption performance of the activated carbon powder, thereby ensuring both high voc adsorption performance and high ozone decomposition performance.

As required, the composition of the present invention may contain an inorganic binder, an organic binder, a flame retardant, and the like.

The composition of the present invention can excellently adsorb and remove voc from the ozone-containing exhaust gas even if the content of the voc in the ozone-containing exhaust gas is small and can excellently decompose and remove ozone in the ozone-containing exhaust gas. Therefore, the composition of the present invention exhibit excellent performance as a composition for purifying the ozone-containing exhaust gas from printing machines such as a copying machine, printer, facsimile machine, and the like.

As an example of a method for using the composition of the present invention, a method of dispersing the composition of the present invention and an adhesive in a solvent to obtain a slurry and applying or spraying the slurry to parts of the printing machine near a high voltage generating section, or impregnating such parts with the slurry to immobilize the activated carbon powder and ozone decomposition catalyst powder can be given. As described later, the composition of the present invention is suitably used for producing a slurry to be used for preparing the filter for purifying an ozone-containing exhaust gas of the present invention.

The filter for purifying an ozone-containing exhaust gas (hereinafter referred to from time to time as "filter of the present invention") comprises a fiber supporting body or metal supporting body carrying the activated carbon powder and ozone decomposition catalyst powder thereon.

The description of the activated carbon powder in the filter of the present invention is omitted insofar as the description of the activated carbon powder for the composition of the present invention can be applied.

The average diameter of the activated carbon powder used in the filter of the present invention is 1-50 μm, and preferably 10-20 μm. If the average diameter of the activated carbon powder is less than 1 μm, the size of the activated carbon particles is too small as compared with the size of the fiber voids, giving rise to a tendency for the activated carbon particles to escape from the fiber voids and, therefore, to drop out from the fiber supporting body. If the average diameter of the activated carbon powder is more than 50 μm, the size of the activated carbon particles is too large, giving rise to reduced diffusion velocity of the voc to be adsorbed in the activated carbon or a increased area of contact with the carrier, whereby the adsorption-removing performance is lowered.

The description of ozone decomposition catalyst powder in the filter of the present invention is omitted insofar as the description of the ozone decomposition catalyst powder for the composition of the present invention can be applied.

The average diameter of ozone decomposition catalyst powder used in the filter of the present invention is 1-100 μm, and preferably 1-50 μm. If the average diameter of the ozone decomposition catalyst powder is less than 1 μm, the size of the ozone decomposition catalyst powder is too small as compared with the size of the fiber voids, giving rise to a tendency of the ozone decomposition catalyst powder to escape from the fiber voids and, therefore, to drop out from the fiber supporting body. If the average diameter of the ozone decomposition catalyst powder is more than 100 μm, the size of the ozone decomposition catalyst powder is too large, giving rise to a reduced adhesion force and easy dropout of the ozone decomposition catalyst powder from the fiber supporting body.

The fiber supporting body is made of a woven or nonwoven fabric obtained by pressing or dry-forming of fiber into a honeycomb structure, for example.

There are no specific limitations to the fibers used as the carrier insofar as the fiber can be used for manufacturing air filters. Examples include inorganic fibers such as silica alumina fiber, silica fiber, alumina fiber, mullite fiber, glass fiber, rock wool fiber, and carbon fiber; and organic fibers such as polyethylene fiber, polypropylene fiber, nylon fiber, polyester fiber, polyvinyl alcohol fiber, aramid fiber, pulp fiber, and rayon fiber. These fibers may be used as the carrier either individually or in combination of two or more. The combination of an inorganic fiber and an organic fiber, particularly the combination of silica alumina fiber and rayon fiber, is preferable in view of high mechanical strength of the filter for purifying the ozone-containing exhaust gas.

Although there are no specific limitations, the average diameter of the fiber used as the carrier is preferably 0.1-25 μm, and particularly preferably 0.5-10 μm, and the average length of the fiber is preferably 0.1-50 mm, particularly preferably 10-20 mm. The average diameter and length of the fiber in the above range are desirable to increase the mechanical strength of the fiber supporting body.

Although there are no specific limitations, the fiber void percentage of the woven or nonwoven fabric formed from the fiber is preferably 50-95%, and particularly preferably of 70-95%. The fiber void percentage here indicates the proportion of the volume obtained by subtracting the volume of fiber in the woven or nonwoven fabric from the total bulk volume of the woven or nonwoven fabric to the total bulk volume of the woven or nonwoven fabric (hereinafter referred to also as "fiber void"). A fiber void percentage in the above range ensures the activated carbon powder and ozone decomposition catalyst powder to be sufficiently carried not only on the external surface of the fiber supporting body but also in the fiber voids, thereby ensuring a larger amount of the activated carbon powder and ozone decomposition catalyst powder to be carried on the fiber. Although there are no specific limitations, the thickness of the woven or nonwoven fabric (t in FIG. 2) is preferably 0.05-0.5 mm, and particularly preferably 0.1-0.3 mm. The thickness of the woven or nonwoven fabric in the above range ensures high mechanical strength of the fiber supporting body, a small pressure loss of the filter, and an increased amount of activated carbon powder and ozone decomposition catalyst powder carried in the fiber voids of the fiber supporting body.

The fiber supporting body can be obtained by forming the woven or nonwoven fabric (hereinafter referred to also as "fiber sheet") by a conventional method. There are no specific limitations to the form of the fiber supporting body. A structure obtainable by alternately laminating a corrugated fiber sheet and a flat fiber sheet (corrugated-honeycomb structure), a structure obtainable by alternately laminating a pleated fiber sheet and a flat fiber sheet perpendicularly to the direction of the air passage, and the like can be given. The corrugated-honeycomb structure in which the ozone-containing exhaust gas passage is parallel to the air flow direction is more preferable due to a low pressure loss.

The corrugated-honeycomb structure will be described by referring to FIGS. 1 and 2. FIG. 1 is a schematic perspective view of the fiber supporting body with a corrugated honeycomb structure. A fiber supporting body 2 is made from a flat fiber sheet 3 and a corrugated fiber sheet 4 alternately laminated. A number of openings 6, each having a shape of an approximately semicircle column, formed by continuing mountains 5 of the corrugated fiber sheet 4, are formed between the corrugated fiber sheet 4 and flat fiber sheet 3. The structure is designed to allow the ozone-containing exhaust gas to flow through the openings 6.

The flat fiber sheet 3 is a flat sheet of woven or nonwoven fabric made of the fiber for the carrier and the corrugated fiber sheet 4 is a waveform object formed by corrugating the flat sheet of woven or nonwoven fabric. Corrugating is a process for fabricating a flat sheet material such as the flat fiber sheet 3 into a waveform object by passing the flat fiber paper through a pair of upper and lower corrugated rolls.

The fiber supporting body 2 can be prepared by alternately laminating the flat fiber sheet 3 and the corrugated fiber sheet 4 using the corrugated fiber sheet 4 as a center core. In this instance, the flat fiber sheet 3 and the corrugated fiber sheet 4 of the center core may be integrated by causing the upper mountains 5 and the lower mountains 5 on the corrugated fiber sheet 4 (the center core) to adhere to the flat fiber sheet 3 using an adhesive, or a laminated body of the flat fiber sheet 3 and the corrugated fiber sheet 4 may be secured in a frame or the like without using an adhesive or the like. As the adhesive used for adhering the flat fiber sheet 3 to the corrugated fiber sheet 4, the same type of inorganic adhesives such as silica sol mentioned later can be given.

Figure 2:
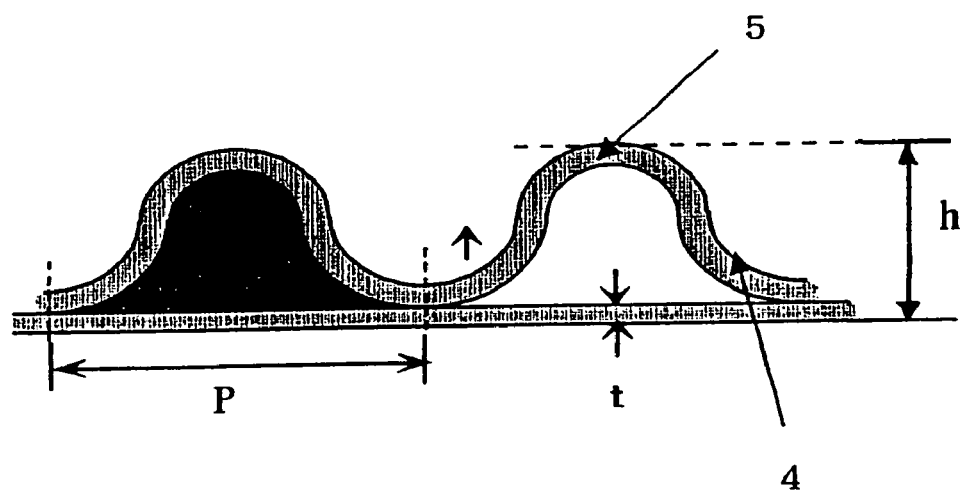

FIG. 2 is a schematic cross-sectional view of the fiber supporting body 2 along the plane parallel to an opening 7. In FIG. 2, the mountains 5 of the corrugated fiber sheet 4 are caused to adhere to the flat fiber sheet 3. Although there are no specific limitations, the height (h in FIG. 2) of the mountain of the fiber supporting body 2 is preferably 0.5-10 mm, more preferably 0.6-5 mm, and still more preferably 0.7-2 mm. The pitch (p in FIG. 2) of the fiber supporting body 2 is preferably 1-20 mm, more preferably 1-5 mm, and still more preferably 1.5-4 mm. The height and pitch in the above range ensures excellent balance between the efficiency of removing ozone and volatile organic compounds in the ozone-containing exhaust gas and the pressure loss.

The metal supporting body is prepared by forming a metal sheet for carriers into a honeycomb structure, for example. The metal supporting body with a honeycomb structure can be prepared in the same manner as the method for preparing a fiber supporting body by using the metal sheet for carriers instead of the flat fiber sheet, for example.

The metal sheet for carriers includes substantially all metallic materials in the form of a sheet. There are no specific limitations to the metallic material used as the metal sheet for carriers. Aluminum, platinum, stainless steel, copper, and the like can be given as examples, with aluminum being preferable due to the lightness, easy processability, variety of hardness and thickness, and cost.

When the metal supporting body has a honeycomb structure, specifically, when instead of the flat fiber sheet 3 and the corrugated fiber sheet 4 in FIG. 2, a flat metal sheet for carriers and a corrugated metal sheet for carriers are respectively used, although not specifically limited, the thickness (t in FIG. 2) is usually 0.1 mm or less, and preferably 10-50 μm. Although there are no specific limitations, the height (h in FIG. 2) of the mountain is preferably 0.5-10 mm, more preferably 0.6-5 mm, and still more preferably 0.7-2 mm. Although there are no specific limitations, the pitch (p in FIG. 2) is preferably 1-20 mm, more preferably 1-5 mm, and still more preferably 1.5-4 mm.

The amount of the activated carbon powder carried on the filter of the present invention is preferably 10-200 g/l, more preferably 20-150 g/l, and still more preferably 30-100 g/l. If the amount of the activated carbon powder carried is less than 10 g/l, performance for removing volatile organic compounds tends to decrease; if more than 200 g/l, the activated carbon powder easily drops out or the pressure loss by the filter tends to unduly increase.

Although there are no specific limitations, the amount of the ozone decomposition catalyst powder carried on the filter of the present invention is preferably 0.1-35 g/l, and particularly preferably 10-30 g/l. If the amount of the ozone decomposition catalyst powder carried on the filter is less than 0.1 g/l, ozone removing performance tends to decrease; if more than 35 g/l, not only the ozone decomposition catalyst powder tends to impair the capability of activated carbon powder to adsorb and remove the volatile organic compounds, but also the manufacturing cost increases.

Although there are no specific limitations, the ratio of the amount of the activated carbon powder to the amount of the ozone decomposition catalyst powder carried on filter is preferably 1-99, more preferably 1.5-9, and still more preferably 2-4. The ratio of the amount of the activated carbon powder to the amount of the ozone decomposition catalyst powder carried on the filter in the above range ensures excellent ozone decomposition performance of the ozone decomposition catalyst powder without impairing the voc adsorption performance of the activated carbon powder, thereby ensuring both high voc adsorption performance and high ozone decomposition performance.

The filter of the present invention can excellently adsorb and remove voc from the ozone-containing exhaust gas even if the content of the voc in the ozone-containing exhaust gas is small and can excellently decompose and remove ozone in the ozone-containing exhaust gas. Therefore, the filter of the present invention exhibit excellent performance as a filter for purifying the ozone-containing exhaust gas from printing machines such as a copying machine, printer, facsimile machine, and the like.

An example for preparing the filter of the present invention will be described below, which should not be construed as limiting the present invention.

First, a slurry is prepared by mixing the activated carbon powder, the ozone decomposition catalyst powder, an adhesive for carrying these powders, and other optional components with water. A flat fiber sheet is corrugated to obtain a corrugated fiber sheet. The flat fiber sheet and the obtained corrugated fiber sheet are laminated one after the other using an adhesive to obtain a fiber supporting body having a corrugated honeycomb structure. Next, the resulting fiber supporting body is subjected to a spraying process in which the above slurry is sprayed on the fiber supporting body or a dipping process in which the fiber supporting body is dipped in the slurry, thereby causing the activated carbon powder and ozone decomposition catalyst powder to be carried on the fiber supporting body. In this manner, the filter of the present invention with the activated carbon powder and ozone decomposition catalyst powder carried thereon can be obtained. The above-described composition of the present invention can be used for preparing the slurry.

Either an inorganic adhesive or an organic adhesive may be used without any specific limitations as the adhesive to be added to the slurry. As the inorganic adhesive, silica sol, alumina sol, titania sol, sodium silicate, potassium silicate, and the like can be given. As the organic adhesive, acrylic resin, vinyl-acetate resin, epoxy resin, phenol resin, silicone resin, their copolymer resins, and the like can be given. Of these, inorganic adhesives are preferable because the cured products of the inorganic adhesives do not produce films but produce flocculants of cured adhesive particles which provide spaces through which ozone-containing exhaust gas can easily permeate, whereby the ozone decomposition performance and the volatile organic compound removal performance can be increased.

Ion-exchange water, distilled water, tap water, industrial water, and the like may be used without any specific limitations as the water for preparing the slurry. When the adhesive contains water, the water in the adhesive may be used as the water for preparing the slurry. For example, when the adhesive is silica sol, water in the silica sol can be used as the water forming the slurry mixture.

As required, the slurry invention may optionally contain a surface active component such as a dispersant.

In the above spraying process, a spraying device for injecting a slurry mist or a shower facility for causing a shower of the slurry to fall can be used for applying the slurry to the fiber supporting body.

After the spraying process, the sprayed product is dried as required. Although there are no specific limitations, the drying treatment is carried out, usually at a temperature of 50-130° C. for 30-120 minutes. The drying treatment is preferable because drying ensures that the activated carbon powder and ozone decomposition catalyst powder are rapidly and certainly carried not only on the external surface of the fiber supporting body but also in the fiber voids.

The slurry may be sprayed either one time or two or more times. When slurry is sprayed two or more times, the sprayed product is dried after each spraying operation, whereby the amount of the activated carbon powder and ozone decomposition catalyst powder carried can be increased.

When a dipping process is selected, although not specifically limited, the fiber supporting body is dipped preferably for 10-300 seconds, and particularly preferably for 30-120 seconds. The dipping treatment is preferable because one dipping operation ensures that a large amount of the activated carbon powder and ozone decomposition catalyst powder is carried not only on the external surface of the fiber supporting body but also in the fiber voids.

Spraying and dipping treatments may be combined.

The filter of the present invention can be also prepared by first spraying the slurry onto a flat fiber sheet or dipping the flat fiber sheet in the slurry to obtain a flat fiber sheet with the activated carbon powder and ozone decomposition catalyst powder carried thereon, and then corrugating the resulting fiber sheet with the activated carbon powder and ozone decomposition catalyst powder carried thereon into a corrugated honeycomb structure.

When the carrier for the filter of the present invention is a metallic carrier, the method for preparing the filter includes, but is not limited to, a method of spraying or dipping the metallic carrier in the same manner as in the method of preparing the filter using the fiber supporting body.

The present invention will be described in more detail by examples, which should not be construed as limiting the present invention.

EXAMPLES (Pore Analysis of Activated Carbon Powder)

An empty test tube was deaerated to about 2 Pa and weighed. About 0.1 g of the activated carbon powder was weighed and put into the test tube and heated to 150° C. Substances attached to the activated carbon powder were removed by a deaeration treatment for 6 hours. The weight of the test tube containing activated carbon powder was measured to determine the weight of the activated carbon powder by subtracting the weight of the empty test tube from the measured weight.

After cooling, the test tube containing activated carbon powder was connected to Bellsoap 18 Plus (manufacture by Bell Japan, Inc.). The test tube and its vicinity was maintained at −196° C. using liquefied nitrogen and pipes and the like other than the test tube were maintained at 40° C. The relative pressure of nitrogen gas was gradually increased from $1\times10^{-7}$ to about 0.95 to measure the adsorbed amount of nitrogen gas. Then, the relative pressure of nitrogen gas was gradually decreased from 0.95 to about $1\times10^{-1}$ to measure the residual amount of adsorbed nitrogen gas and to determine the nitrogen adsorption-desorption isotherm.

The nitrogen adsorption-desorption isotherm thus obtained in this manner was analyzed by the MP method to determine the volume of pores A (ml/g) having a pore diameter of 0.4-0.8 nm and the volume of pores B (ml/g) having a pore diameter of 0.4-2.0 nm, based on which results the percentage (C) of the volume of pores having a pore diameter of 0.4-0.8 nm to the volume of pores having a pore diameter of 0.4-2.0 nm was calculated.

Example 1

(Preparation of Filter)

A flat fiber sheet with a fiber void of 90% and a thickness (t in FIG. 2) of 0.1 mm was prepared from a mixture of 25 wt % of E-glass fiber (average fiber diameter: 6 μm) and 75 wt % of ceramic fiber ($SiO_2$:$Al_2O_3$=1:1, average fiber diameter: 3 μm) by a wet paper milling method. The flat fiber sheet was caused to pass through a pair of waveform corrugators to obtain a corrugated fiber sheet. After applying silica sol to the mountain parts of the corrugated fiber sheet as an adhesive, the flat fiber sheets were superposed and laminated. The corrugated fiber sheet and the flat fiber sheet were laminated in turn so that the air passages are aligned in the same direction, thereby obtaining a fiber supporting body having a corrugated honeycomb substrate shown in FIG. 1 and FIG. 2 with a center core pitch (p in FIG. 2) of 2.5 mm and a mountain height (h in FIG. 2) of 1.1 mm.

Next, a slurry was prepared by dispersing 75 parts by weight of activated carbon powder A dried at 110° C., 25 parts by weight of manganese oxide, and 20 parts by weight of an inorganic adhesive in 100 parts by weight of water. The fiber supporting body was dipped in the slurry for 10 seconds, removed from the slurry, and dried to obtain a filter A with the activated carbon powder A and manganese oxide carried thereon. The amounts of the activated carbon powder and manganese oxide carried on a unit volume of the filter A were respectively 50 g/l and 17 g/l.

Activated carbon powder A: Average particle diameter: 12.6 μm, total pore volume: 0.48 ml/g, specific surface area: 1075 $m^2$/g, volume of pores A having a pore diameter of 0.4-0.8 nm: 0.38 ml/g, volume of pores B having a pore diameter of 0.4-2.0 nm: 0.46 ml/g, percentage C of the volume of pores having a pore diameter of 0.4-0.8 nm to the volume of pores having a pore diameter of 0.4-2.0 nm: 83%

Average particle diameter of manganese oxide: 5.1 μm

Inorganic adhesive: Silica sol, "Snowtex" manufacture by Nissan Chemical Industries, Ltd.)

The filter A was cut into a cylinder with a diameter of 20 mm and a thickness of 10 mm and the cylinder was installed in a circulation evaluation apparatus.

(Performance Evaluation 1)

A test of styrene removal and ozone decomposition was carried out under the following conditions using the filter A. As a result, the gas after passing the filter A was confirmed to have a styrene content of 2 $mg/m^3$ and an ozone content of 50 $mg/m^3$.

Test Conditions
    Composition of feed gas: air with a styrene content of 100 $mg/m^3$ and ozone content of 1,000 $mg/m^3$.
    Temperature and humidity of the feed gas: 25° C., 50% RH
    Gas feed rate: 0.2 m/sec (Performance Evaluation 2)

A life test of the filter was carried out under the following conditions using the filter A. As a result, the styrene removal rate was confirmed to be initially 98%, and 79% after 30 hours, the ozone decomposition rate was confirmed to be initially 95%, and 85% after 30 hours.

Test Conditions
    Composition of feed gas: air with a styrene content of 1,000 $mg/m^3$ and ozone content of 1,000 $mg/m^3$
    Temperature and humidity of the feed gas: 25° C., 50% RH
    Gas feed rate: 0.2 m/sec

Comparative Example 1

(Preparation of Filter)

A filter B was prepared in the same manner as in Example 1, except that 25 parts by weight of activated carbon powder B and 75 parts by weight of manganese oxide were used instead of 75 parts by weight the activated carbon powder A and 25 parts by weight of manganese oxide. The amounts of the activated carbon powder B and manganese oxide carried on a unit volume of the filter B were respectively 18 g/l and 53 g/l.

Activated carbon powder B: Average particle diameter: 12.5 µm, total pore volume: 0.78 ml/g, specific surface area: 1583 m$^2$/g, volume of pores A having a pore diameter of 0.4-0.8 nm: 0.34 ml/g, volume of pores B having a pore diameter of 0.4-2.0 nm: 0.73 ml/g, percentage C of the volume of pores having a pore diameter of 0.4-0.8 nm to the volume of pores having a pore diameter of 0.4-2.0 nm: 47%

(Performance Evaluation 1)

The same test as in Example 1 was carried out using the filter B instead of the filter A. As a result, the gas after passing the filter B was confirmed to have a styrene content of 20 mg/m$^3$ and an ozone content of 50 mg/m$^3$.

(Performance Evaluation 2)

The same test as in Example 1 was carried out using the filter B instead of the filter A. As a result, the styrene removal rate was confirmed to be initially 98%, and 50% after 30 hours, the ozone decomposition rate was confirmed to be initially 95%, and 85% after 30 hours.

Example 2

(Preparation of Filter)

A filter C was prepared in the same manner as in Example 1, except that 90 parts by weight of activated carbon powder A and 10 parts by weight of manganese oxide were used instead of 75 parts by weight the activated carbon powder A and 25 parts by weight of manganese oxide. The amounts of the activated carbon powder A and manganese oxide carried on unit volume of the filter C were respectively 63 g/l and 7 g/l.

(Performance Evaluation 1)

The same test as in Example 1 was carried out using the filter C instead of the filter A. As a result, the gas after passing the filter C was confirmed to have a styrene content of 2 mg/m$^3$ and an ozone content of 50 mg/m$^3$.

(Performance Evaluation 2)

The same test as in Example 1 was carried out using the filter C instead of the filter A. As a result, the styrene removal rate was confirmed to be initially 98%, and 82% after 30 hours, the ozone decomposition rate was confirmed to be initially 95%, and 75% after 30 hours.

Example 3

(Preparation of Filter)

A filter D was prepared in the same manner as in Example 1, except that 75 parts by weight of activated carbon powder C and 25 parts by weight of manganese oxide were used instead of 75 parts by weight the activated carbon powder A and 25 parts by weight of manganese oxide. The amounts of the activated carbon powder C and manganese oxide carried on unit volume of the filter D were respectively 53 g/l and 18 g/l.

Activated carbon powder C: average particle diameter: 15.4 µm, total pore volume: 0.45 ml/g, specific surface area: 1,008 m$^2$/g, volume of pores A having a pore diameter of 0.4-0.8 nm: 0.33 ml/g, volume of pores B having a pore diameter of 0.4-2.0 nm: 0.42 ml/g, percentage C of the volume of pores having a pore diameter of 0.4-0.8 nm in the volume of pores having a pore diameter of 0.4-2.0 nm: 79%

(Performance Evaluation 1)

The same test as in Example 1 was carried out using the filter D instead of the filter A. As a result, the gas after passing the filter D was confirmed to have a styrene content of 2 mg/m$^3$ and an ozone content of 52 mg/m$^3$.

(Performance Evaluation 2)

The same test as in Example 1 was carried out using the filter D instead of the filter A. As a result, the styrene removal rate was confirmed to be initially 98% and 73% after 30 hours, the ozone decomposition rate was confirmed to be initially 95% and 88% after 30 hours.

Comparative Example 2

(Preparation of Filter)

A filter E was prepared in the same manner as in Example 1, except that 75 parts by weight of activated carbon powder D and 25 parts by weight of manganese oxide were used instead of 75 parts by weight the activated carbon powder A and 25 parts by weight of manganese oxide. The amounts of the activated carbon powder D and manganese oxide carried on unit volume of the filter E were respectively 48 g/l and 17 g/l.

Activated carbon powder D: Average particle diameter: 14.8 µm, total pore volume: 0.72 ml/g, specific surface area: 1,494 m$^2$/g, volume of pores A having a pore diameter of 0.4-0.8 nm: 0.39 ml/g, volume of pores B having a pore diameter of 0.4-2.0 nm: 0.67 ml/g, percentage C of the volume of pores having a pore diameter of 0.4-0.8 nm in the volume of pores having a pore diameter of 0.4-2.0 nm: 58%

(Performance Evaluation 1)

The same test as in Example 1 was carried out using the filter E instead of the filter A. As a result, the gas after passing the filter E was confirmed to have a styrene content of 23 mg/m$^3$ and an ozone content of 50 mg/m$^3$.

(Performance Evaluation 2)

The same test as in Example 1 was carried out using the filter E instead of the filter A. As a result, the styrene removal rate was confirmed to be initially 98% and 60% after 30 hours, the ozone decomposition rate was confirmed to be initially 97% and 83% after 30 hours.

TABLE 1

| | Example | | | Comparative Example | |
|---|---|---|---|---|---|
| Amount (parts by weight) | 1 | 2 | 3 | 1 | 2 |
| Water | 100 | 100 | 100 | 100 | 100 |
| Activated carbon powder A | 75 | 90 | — | — | — |
| Activated carbon powder B | — | — | — | 25 | — |
| Activated carbon powder C | — | — | 75 | — | — |
| Activated carbon powder D | — | — | — | — | 75 |
| Manganese oxide | 25 | 10 | 25 | 75 | 25 |

TABLE 1-continued

|  | Example | | | Comparative Example | |
|---|---|---|---|---|---|
| Amount (parts by weight) | 1 | 2 | 3 | 1 | 2 |
| Inorganic adhesive | 20 | 20 | 20 | 20 | 20 |
| Amount carried on (g/l) | | | | | |
| Activated carbon powder | 50 | 63 | 53 | 18 | 48 |
| Manganese oxide | 17 | 7 | 18 | 53 | 17 |

The composition and filter for purifying an ozone-containing exhaust gas of the present invention can significantly reduce the content of ozone and volatile organic compounds from ozone-containing gas emitted by printing machines. Therefore, it is possible to manufacture printing machines that can meet stringent regulations on emission of the ozone and volatile organic compounds by using the composition and filter.

What is claimed is:

1. A composition for purifying an ozone-containing exhaust gas comprising activated carbon powder, in which the percentage of the volume of pores having a pore diameter of 0.4-0.8 nm in the volume of pores have a pore diameter of 0.4-2.0 nm is 75% or more, and an ozone decomposition catalyst powder.

2. The composition according to claim 1, wherein the ozone decomposition catalyst powder is a manganese oxide powder, a composite oxide powder of copper oxide and manganese oxide, a composite oxide powder of iron oxide and manganese oxide, or a composite oxide powder of cobalt oxide and manganese oxide.

3. The composition according to claim 1, wherein the weight ratio of the activated carbon powder to the ozone decomposition catalyst powder is 1-99.

4. The composition according to claim 1, wherein the average particle diameter of the ozone decomposition catalyst powder is 1-100 μm.

5. The composition according to claim 1, wherein the ozone decomposition catalyst powder ranges in content from 1-50 wt %.

6. The composition according to claim 1, wherein the pores of the activated carbon powder have a total pore volume 0.1-2 ml/g.

7. A filter for purifying an ozone-containing exhaust gas comprising activated carbon powder, in which the percentage of the volume of pores having a pore diameter of 0.4-0.8 nm in the volume of pores have a pore diameter of 0.4-2.0 nm is 75% or more, and an ozone decomposition catalyst powder carried on a fiber supporting body or a metal supporting body.

8. The filter according to claim 7, wherein the ozone decomposition catalyst powder is a manganese oxide powder, a composite oxide powder of copper oxide and manganese oxide, a composite oxide powder of iron oxide and manganese oxide, or a composite oxide powder of cobalt oxide and manganese oxide.

9. The filter according to claim 7, wherein the activated carbon fiber is present per unit volume of the filter in an amount ranging from 10-200 g/l.

10. The filter according to claim 8, wherein the activated carbon fiber is present per unit volume of the filter in an amount ranging from 10-200 g/l.

11. The filter according to claim 7, wherein the ozone decomposition catalyst powder is present per unit volume of the filter in an amount ranging from 0.1-35 g/l.

12. The filter according to claim 7, wherein the weight ratio of the activated carbon powder to the ozone decomposition catalyst powder carried on the filter is 1-99.

13. The filter according to claim 7, wherein the average particle diameter of the activated carbon powder is 1-50 μm.

14. The filter according to claim 7, wherein the average particle diameter of the ozone decomposition catalyst powder is 1-100 μm.

* * * * *